United States Patent [19]

Borchew et al.

[11] Patent Number: 5,536,176

[45] Date of Patent: Jul. 16, 1996

[54] FLEXIBLE BUS ROUTING STRUCTURE

[75] Inventors: Howard J. Borchew, Sunnyvale, Calif.; Mary H. Henske, Ann Arbor, Mich.

[73] Assignee: Tandem Computers Incorporated, Cupertino, Calif.

[21] Appl. No.: 248,805

[22] Filed: May 25, 1994

[51] Int. Cl.⁶ ..................................... H05K 1/14
[52] U.S. Cl. ............................. 439/61; 361/788
[58] Field of Search ................. 439/61; 361/788, 361/803, 777, 778, 785, 827

[56] References Cited

U.S. PATENT DOCUMENTS

| | | | |
|---|---|---|---|
| 3,800,097 | 3/1974 | Maruscak et al. | 361/680 |
| 4,237,546 | 12/1980 | Wells | 361/788 |
| 4,401,351 | 8/1983 | Record | 439/61 |
| 4,647,123 | 3/1987 | Chin et al. | 361/785 |
| 4,658,333 | 4/1987 | Grimes | 361/413 |
| 4,997,390 | 3/1991 | Scholz et al. | 439/79 |
| 5,038,308 | 8/1991 | Le et al. | 354/708 |

FOREIGN PATENT DOCUMENTS

| | | |
|---|---|---|
| 0585548A1 | 3/1994 | European Pat. Off. . |
| 2695790A1 | 3/1994 | France . |
| 2192098A | 12/1987 | United Kingdom . |

*Primary Examiner*—Neil Abrams
*Attorney, Agent, or Firm*—Graham & James

[57] ABSTRACT

A modular bus routing system incorporates segments of a plurality of parallel buses in a substrate on which device connectors are strategically located. Each end of each bus segment is coupled to a connector mounted on the substrate and interconnection between bus segments on different substrates is afforded by a flexible cable containing bus conductors of controlled length and electrical characteristics. A plurality of personality cards provide several different types of bus segment interconnection so that different segments can be terminated, or jumpered to other segments on the substrate. By selecting different personality cards, the plurality of bus segments on a given substrate can be configured as a single serially connected bus, two, four or eight buses. The system affords wide flexibility for computer systems using host initiators and mass storage devices to provide a highly configurable computer system using such elements.

28 Claims, 13 Drawing Sheets

FLEXIBLE BUS ROUTING STRUCTURE

BACKGROUND OF THE INVENTION

This invention relates to electrically conductive buses of the type found in computer systems. More particularly, this invention relates to multiple conductor electrically conductive buses used to electrically intercouple electrical devices found in computer systems.

Computer systems are known which employ electrically conductive bus structures as the mechanism for intercoupling various computer system devices so that the devices are capable of mutual interaction involving the exchange of data and control signals. Many bus systems employ flexible cables, typically flat cables, having embedded therein multiple electrically conductive paths forming the bus, as well as connectors spaced along the cable for enabling electrical interconnection with various devices comprising the computer system, such as host computers, mass storage devices, and file servers. The currently popular SCSI bus defined by ANSI document X3.131, the disclosure of which is hereby incorporated by reference, is an example of such a computer bus. In the SCSI bus, a plurality of devices (typically from two to eight) may be connected, with the individual devices typically consisting of one or two initiators (usually the computer) and one to seven target devices (usually storage devices such as disc drives or tape drives). As with most computer buses, there are technical standards which must be adhered to in order to guarantee reliable signaling among the various devices connected to the bus and thus reliable system operation. For the SCSI bus, the maximum cumulative bus length is limited to 6.0 m. A stub length of no more than 0.1 m is allowed, and it is recommended that stubs be spaced at least 0.3 m apart. For fast synchronous data transfers, the characteristic impedance of the bus must fall within the range of 90–132 ohms. In addition, to minimize discontinuities and signal reflections, the standard recommends that different impedances not be used along the same bus. Also, a terminator is connected to each end of the bus to provide signal integrity and proper voltage level biasing. Other buses have similar standards requiring compliance.

When implementing a computer bus by using cables and connectors, it is at least technically challenging to design and implement a particular bus configuration while ensuring consistency with the bus technical standards. This difficulty is exacerbated by variations in the electrical characteristics of the cables themselves, as well as the specific problems engendered by a particular system configuration. Further, when a plurality of buses are employed in a given computer system, this difficulty is further multiplied. In addition, for a computer system which is intended to be highly configurable, the difficulties in designing a reliable bus structure are further multiplied.

SUMMARY OF THE INVENTION

The invention comprises a bus routing technique or arrangement which is relatively simple to install and maintain, provides great flexibility in the selection of bus routing arrangements, and enables reliable determination of compliance with the technical bus standards applicable to a particular bus scheme.

In its broadest aspect, the invention comprises a bus routing apparatus for enabling selective interconnection of active computing devices, the apparatus comprising a substrate having a pair of oppositely disposed connector portions each having a plurality of connector pads, a plurality of multiple conductor bus path groups carried by the substrate and coupled between the connector pads of the connector portions, a plurality of multiple terminal device connectors carried by the substrate and electrically coupled to selected ones of the bus path groups, at least one multiple conductor flexible cable having end connectors removably attachable to the connector portions of the substrate for enabling electrical coupling of the bus path groups to associated computing devices, and at least one bus path defining card connector removably attachable to the connector portion of the substrate, the card connector including a plurality of electrically conductive paths for selectively coupling the bus path groups carried by the substrate.

The substrate preferably has a plurality of pairs of connector portions, with each pair being located adjacent a different edge portion of the substrate. The card connector is preferably configured to be removably attached to two of the connector portions located adjacent the same edge portion.

The individual connectors of the bus path groups are electrically coupled to individual ones of the connector pads.

The device connectors are preferably arranged in first and second groups, the first group being located on an obverse surface of the substrate and the second group being located on a reverse surface of the substrate to facilitate physical arrangement of associated active computing devices, such as individual disc drives and individual drive controllers.

The electrically conductive paths of the bus path defining card connector are arranged in a plurality of card path groups each associated to a different one of the bus path groups, and a library of such card connectors provides several different standard configurations. The library includes an interconnection configuration to external buses, a bus terminator configuration, a jumper type bus routing connection, an alternating terminator/jumpering connection, a combined jumpering/terminator connection with terminators placed at each end of the card, and a skewed bus routing connection in which terminators and jumpering sections are arranged in an asymmetric fashion.

A plurality of such bus routing apparatus can be coupled together using appropriate personality card connectors to configure any of a wide variety of possible single or multiple bus configurations. Since each substrate has identical topography, the electrical characteristics are highly predictable, so that characteristics such as total bus length, minimum stub spacing, impedance and the like can be accurately determined in a convenient fashion. As a consequence, bus routing arrangements can be designed in a relatively straightforward fashion, and easily installed and maintained. Because the invention is based on a modular approach, reconfiguration and expansion of an original bus configuration can be readily accomplished, thereby affording great flexibility to computer systems incorporating the invention.

For a fuller understanding of the nature and advantages of the invention, reference should be had to the ensuing detailed description taken in conjunction with the accompanying drawings.

DETAILED DESCRIPTION OF THE PREFERRED EMBODIMENTS

Figure 1:
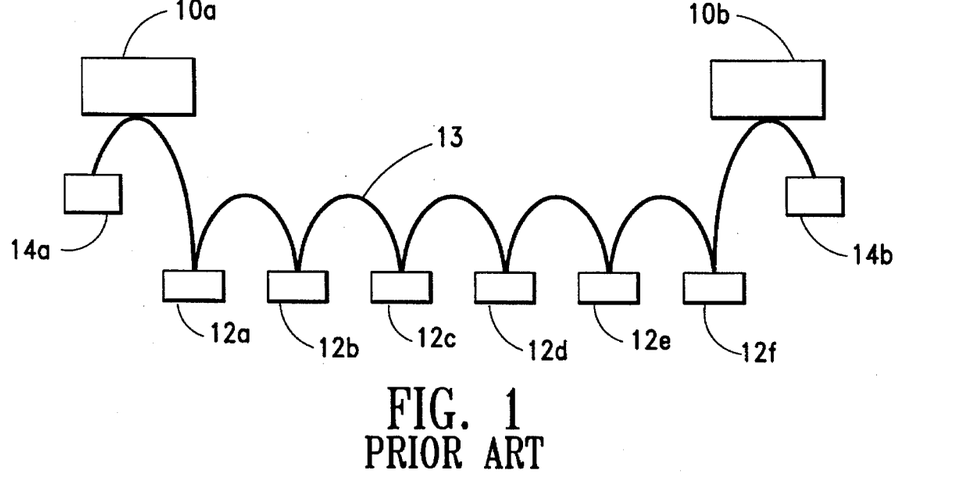
FIG. 1 is a schematic illustration of a representative bus routing configuration.

Turning now to the drawings, FIG. 1 is a schematic diagram illustrating a typical use of a SCSI bus to interconnect multiple devices in a computer system. A pair of initiator devices 10a, 10b, which are typically computers, are electrically coupled to a plurality of target devices 12a–12f, which are typically disc drives, by means of a multiple conductor bus 13. Bus 13 is typically implemented by means of a flexible flat cable having the required number of conductors embedded therein, as well as a plurality of appropriate connectors for effecting the proper mechanical and electrical contacts required. A pair of terminator devices 14a, 14b are electrically connected to opposite ends of the bus 13 in order to provide the proper impedance termination characteristics. As will be appreciated by those skilled in the art, target devices 12a–12f are coupled in a daisy-chain configuration.

In order to ensure that the system depicted in FIG. 1 is configured within the parametric requirements defined by the bus standard, care must be taken to ensure that the total length of the individual cable sections comprising the bus 13 do not exceed the recommended maximum length (6.0 m for the SCSI bus defined in ANSI document X3.131). Other parameters must also be observed, such as a SCSI bus stub length of no more than 0.1 m and an inter-stub spacing of at least 0.3 m. In addition, the characteristic impedance of the SCSI bus must fall within the prescribed range of 90–132 ohms, and substantially identical impedances should be used in order to minimize discontinuities and signal reflections. Each terminator 14a, 14b must be selected such that proper voltage level biasing and signal integrity are maintained. All of these considerations dictate that a relatively high level of skill and care must be exercised when configuring the system depicted in FIG. 1. Further, when adding or deleting initiators and targets, the limiting factors just noted also come into play, which tends to complicate and lengthen the reconfiguration process.

Figure 2:
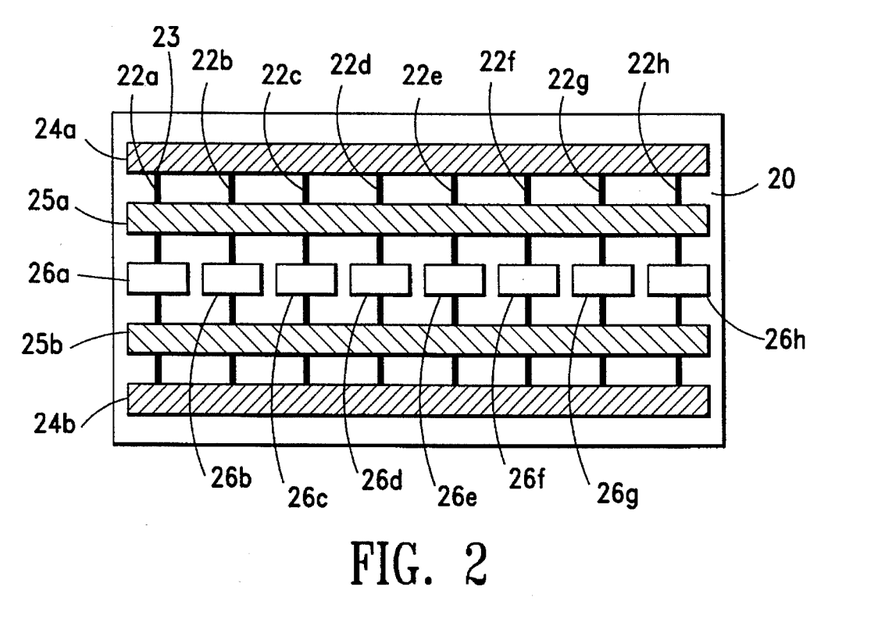
FIG. 2 is a schematic illustration of the invention.

FIG. 2 illustrates the invention from a schematic point of view. As seen in this figure, a substrate 20 composed of a suitable rigid medium, such as a printed wiring board, has formed therein or thereon a plurality of multiconductor bus sections. For a SCSI bus, each bus section 22a–22h comprises eighteen separate conductors: nine for signaling data and nine for control signals. Bus sections 22a–22h are arranged generally in parallel fashion, which simplifies the task of controlling the linear path length of each bus section. The rigid medium from which substrate 20 is fabricated is chosen such that the characteristic impedance of each bus section can be specified and will be predictable.

Each end of each bus segment 22a–22h is mechanically and electrically connected to an appropriate interconnect connector 24a, 24b via a plurality of pads 23 in order to enable the bus segments on a given substrate 20 to be coupled to each other and to other bus segments on other substrates 20.

Also mechanically and electrically coupled to bus segments 22a–22h are a plurality of initiator connectors 25a, 25b, which enable electrical coupling between the bus segments and associated initiators intended for local and proximal coupling, such as an initiator controller for a plurality of local disc drives. Also, initiator connectors 25a, 25b enable electrical coupling to associated elements of a computer system which are external to substrate 20, such as external SCSI buses, host initiators and the like.

Also mechanically and electrically coupled to bus segments 22a–22h are a plurality of target connectors 26a–26h provided for the purpose of enabling local and proximal target devices to be electrically coupled to the bus segments 22a–22h.

Figure 3A:
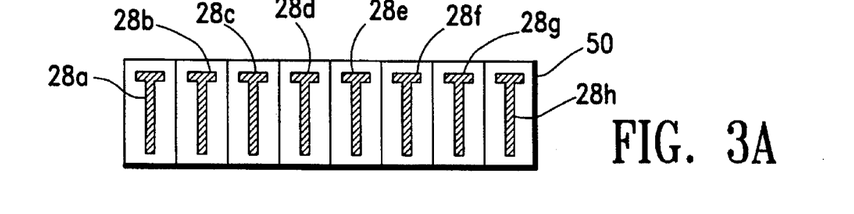
FIGS. 3A–F are schematic illustrations of six different types of bus path defining card connectors.

Interconnect connectors 24a, 24b have a dual purpose: first, to provide an interconnection capability between the local bus segments 22a–22h and other bus segments on another substrate 20; and second, to enable proper termination and interconnection of local bus segments, depending on the requirements of a particular application. In order to provide this adaptive capability, bus path defining card connectors—termed personality cards—are provided for use with the invention of FIG. 2. A plurality of such personality cards 50 are schematically illustrated in FIGS. 3A–3F. FIG. 3A illustrates a terminator card—termed a T-type card—in which each bus segment 22a–22h is individually terminated by means of individual conductive terminator sections 28a–28h. Thus, when a terminator card as shown in FIG. 3A is physically connected to one of the two interconnect connectors 24a, 24b, each bus segment 22a–22h is coupled to the corresponding terminator section 28a–28h. Since the terminator card can be produced using standard photolithographic printed circuit board techniques, the physical dimensions and thus the electrical characteristics of the individual terminator sections 28a–28h can be precisely controlled.

Figure 3B:
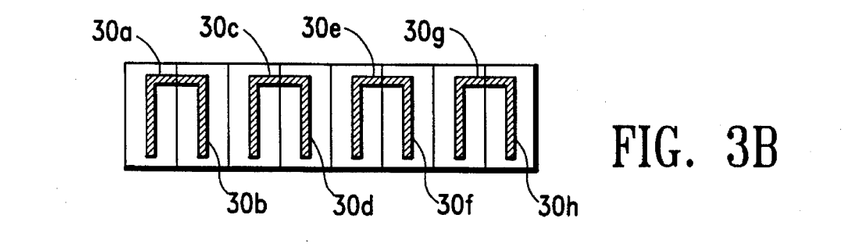

FIG. 3B illustrates a J-type personality card having paired jumper sections comprising jumper pairs 30a, 30b; 30c, 30d; 30e, 30f; and 30g, 30h. When the J-type connector is physically connected to one of the two interconnect connectors 24a, 24b, adjacent bus segments are electrically intercoupled. Thus, bus segment 22a is coupled to bus segment 22b, bus segment 22c is coupled to bus segment 22d, etc.

Figure 3C:
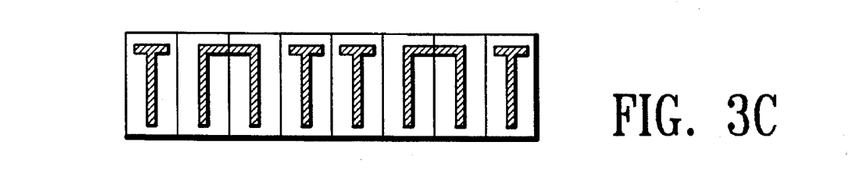

FIG. 3C illustrates an alternating terminator/jumper personality card, termed an A-type card, which provides alternate termination and jumpering of corresponding bus segments. Thus, when connected to connector 24a or 24b, the A-type card of FIG. 3C provides termination for bus segments 22a, 22d, 22e, and 22h; while jumpering together or electrically interconnecting bus segments 22b, 22c and bus segments 22f and 22g.

Figure 3D:
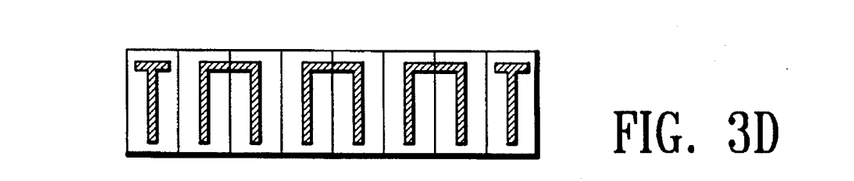

FIG. 3D illustrates an end terminating/jumpering personality card, termed an E-type card, in which the bus segments 22a, 22h located at extreme ends of the bus segment array are terminated, while the bus segments therebetween are jumpered in pairs. Thus, bus segments 22b is electrically coupled to bus segment 22c; bus segment 22d is electrically coupled to bus segment 22e; and bus segment 22f is electrically coupled to bus segment 22g.

Figure 3E:
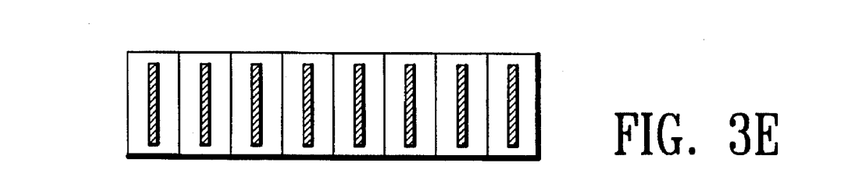

FIG. 3E illustrates an interconnect card, termed an I-type card, the purpose of which is to provide one on one connection between each bus segment 22a–22h and corresponding bus segments on other substrates 20.

Figure 3F:
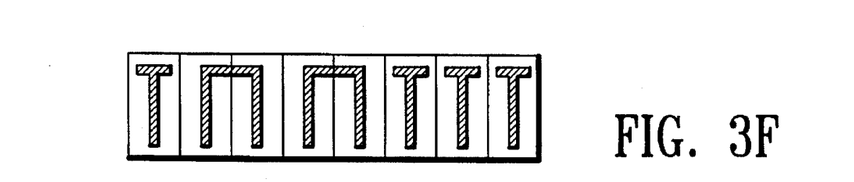

FIG. 3F illustrates a side terminator personality card, termed an S-type, in which an asymmetric jumpering and termination is provided. More specifically, bus segments 22a and 22f–22h are terminated while bus segments 22b–22e are jumpered in adjacent pairs.

Figure 4:
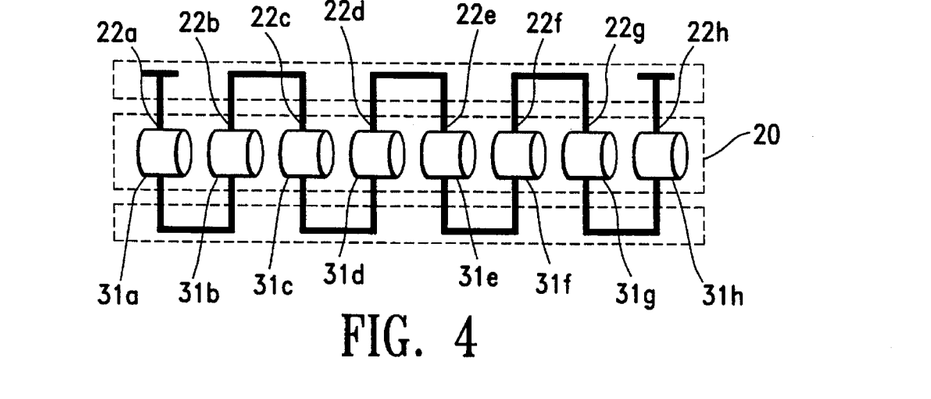
FIGS. 4–7 are schematic illustrations of several different bus routing arrangements made possible by the invention.

FIGS. 4–7 illustrate how the modular substrates 20 can be combined with the personality cards illustrated in FIGS. 3A–3F to configure the array of bus segments in different ways. FIG. 4 illustrates a daisy-chained connection of eight disc drive targets 31a–31h. To achieve this configuration, two personality cards are used: an E-type card (FIG. 3D) installed on connector 24a, and a J-type card (FIG. 3B) installed on connector 24b. As is evident from FIG. 4, this arrangement provides a single bus terminated at each end and connected in serial fashion to the target devices 31a–31h.

Figure 5:
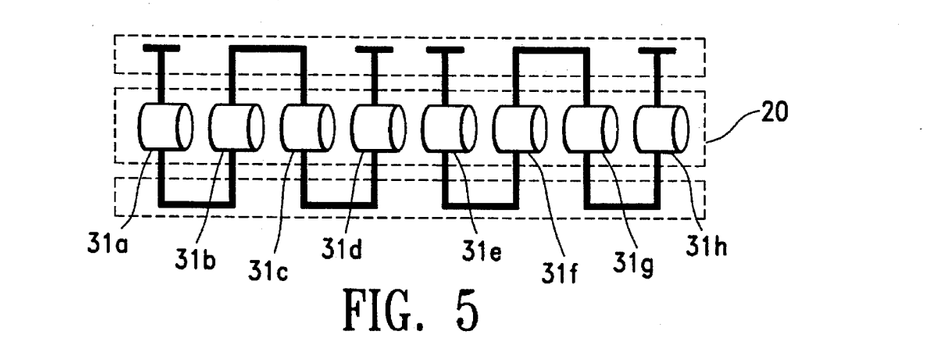

FIG. 5 illustrates configuration of a single module substrate 20 into a pair of buses terminated at each end and serially interconnecting four individual target devices. This configuration is achieved by selecting an A-type card (FIG. 3C) and a J-type card (FIG. 3B) for connection to the connectors 24a, 24b.

Figure 6:
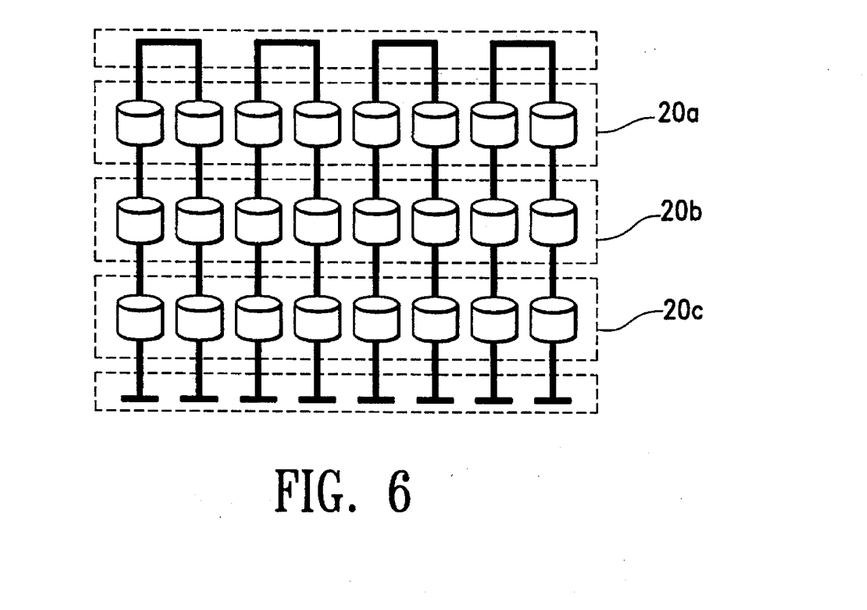

FIG. 6 illustrates the use of three substrate modules 20a–20c to provide four individual buses each serially interconnecting six target devices. In this arrangement, the uppermost module substrate 20a has a J-type card installed on connector 24a; the lowermost substrate 20c has a T-type card (FIG. 3A) connected to lower connector 24b; and a pair of I-type connectors (FIG. 3E) are used to interconnect substrates 20a–20b, and substrate 20b to substrate 20c.

Figure 7:
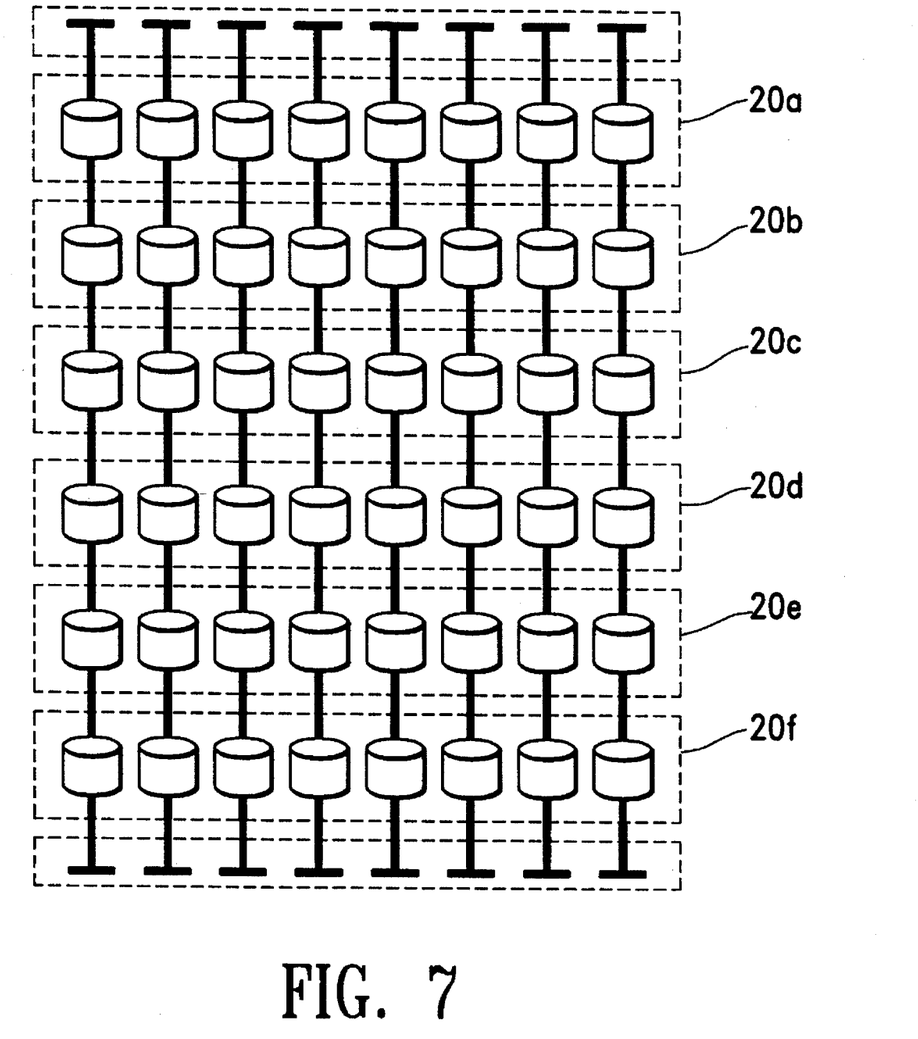

FIG. 7 illustrates the use of six module substrates 20a–20f to provide eight separate buses each providing serial interconnection between six target devices. This configuration is achieved by using T-type cards at the upper and lowermost connectors in the array, and I-type cards in between.

Figure 8:
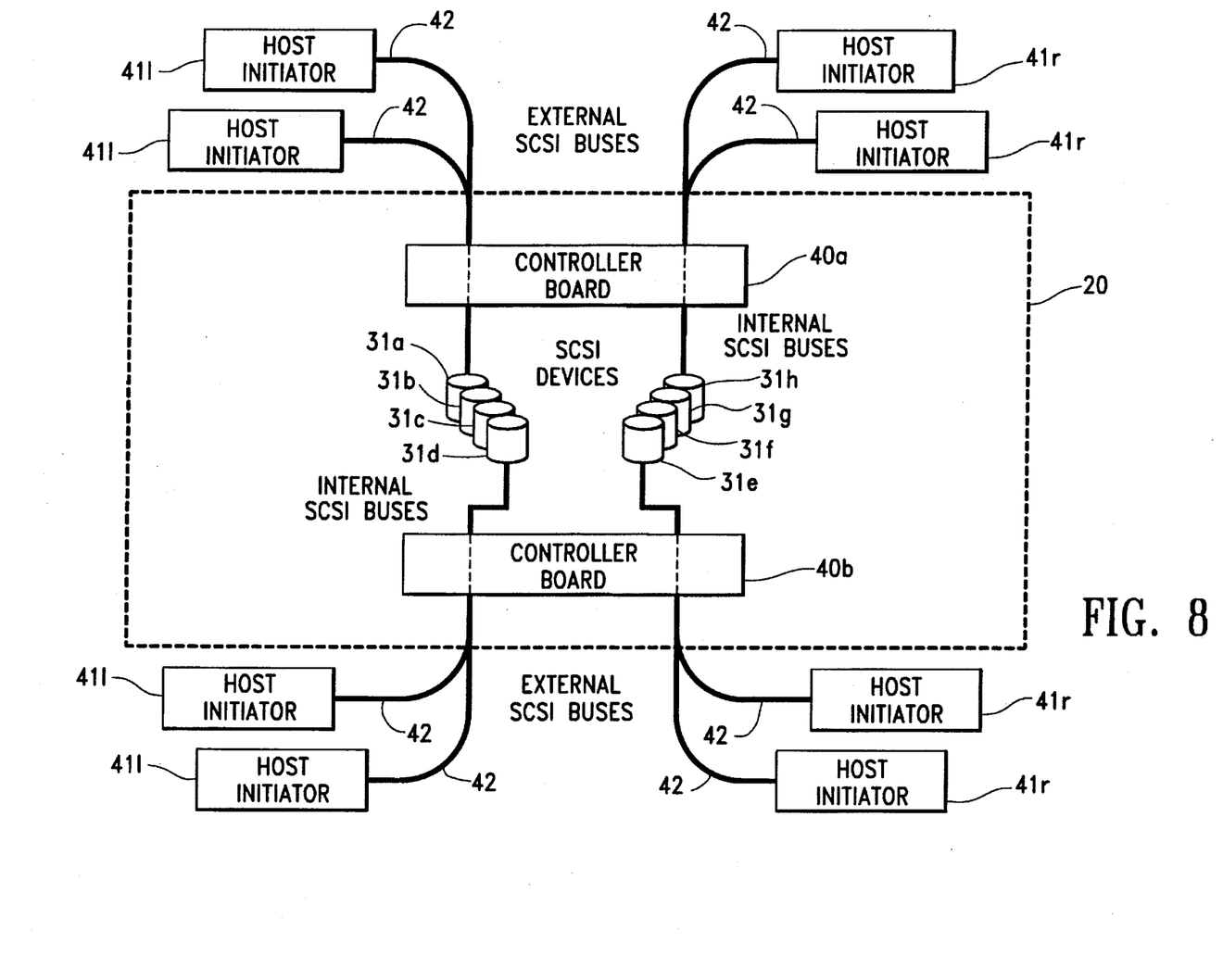
FIGS. 8–10 are schematic illustrations of representative system configurations for computer systems incorporating the bus routing arrangements of FIGS. 5–7.
Figure 9:
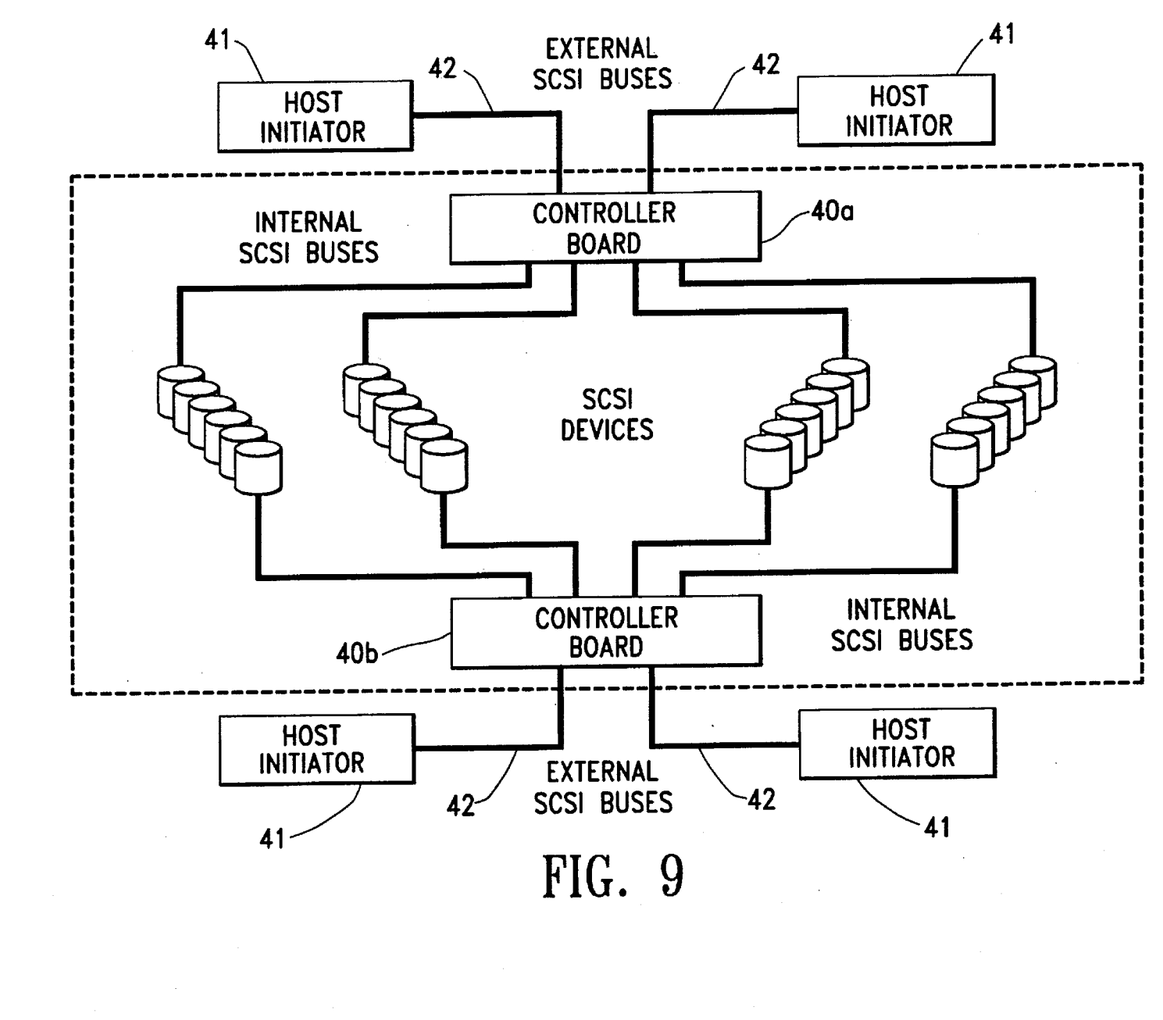
Figure 10:
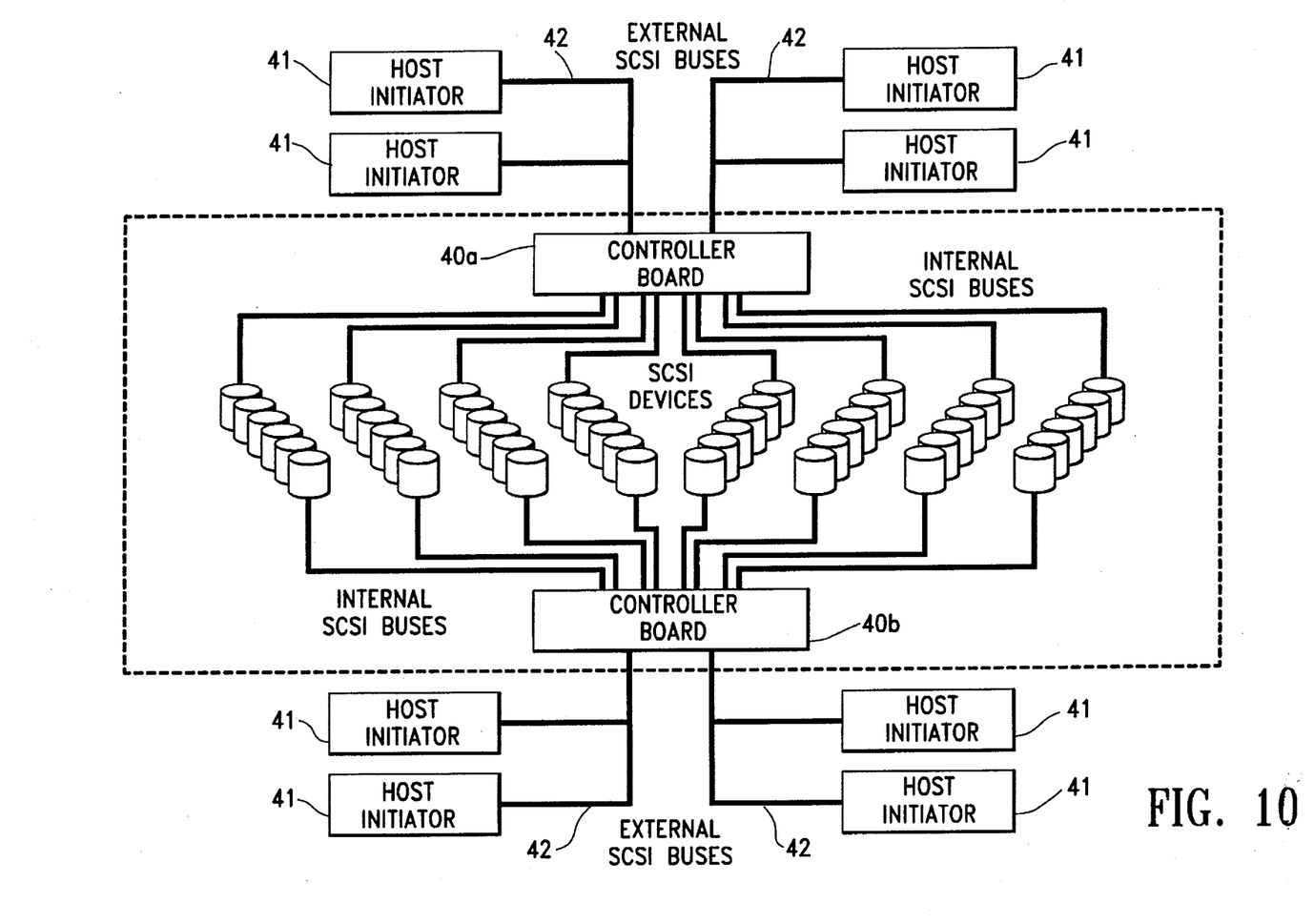

FIGS. 8–10 illustrate the architecture of computer systems using the bus routing arrangements described above with reference to FIGS. 5–7. FIG. 8 is the system architecture corresponding to the FIG. 5 bus routing scheme. As seen in this figure, a pair of controller boards 40a, 40b, which are coupled to initiator connectors 25a, 25b (FIG. 2) are coupled to a plurality of host initiators 41 by means of external SCSI buses 42. The host initiators 41l on the left hand portion of FIG. 8 are interactive with target devices 31a–31d; while host initiators 41r are interactive with target devices 31e–31h.

FIG. 9 illustrates the system architecture counterpart employing the bus routing arrangement shown in FIG. 6. As seen in this figure, a pair of controller boards 40a, 40b are coupled to a plurality of host initiators 41 by means of external SCSI buses 42. Each group of six target devices is coupled to both controller boards 40a, 40b, which are installed in the initiator connectors 25a, 25b of the appropriate ones of module substrates 20a–20c. Since all four buses are accessible by the initiator connectors 25a, 25b on each of the substrate modules 20a–20c, the controller boards 40a, 40b may be installed in the initiator connector most suitable for the particular system configuration, taking into account the mechanical and electrical bus parameters and device addressing requirements.

FIG. 10 illustrates the system architecture for the bus routing arrangement shown in FIG. 7. As seen in this figure, a plurality of host initiators 41 communicate with the controller boards 40a, 40b via external SCSI buses 42. As with the system shown in FIG. 9, the controller boards 40a, 40b may be installed in the most convenient and optimum initiator connector 25a, 25b on substrate modules 20a–20f.

Figure 11:
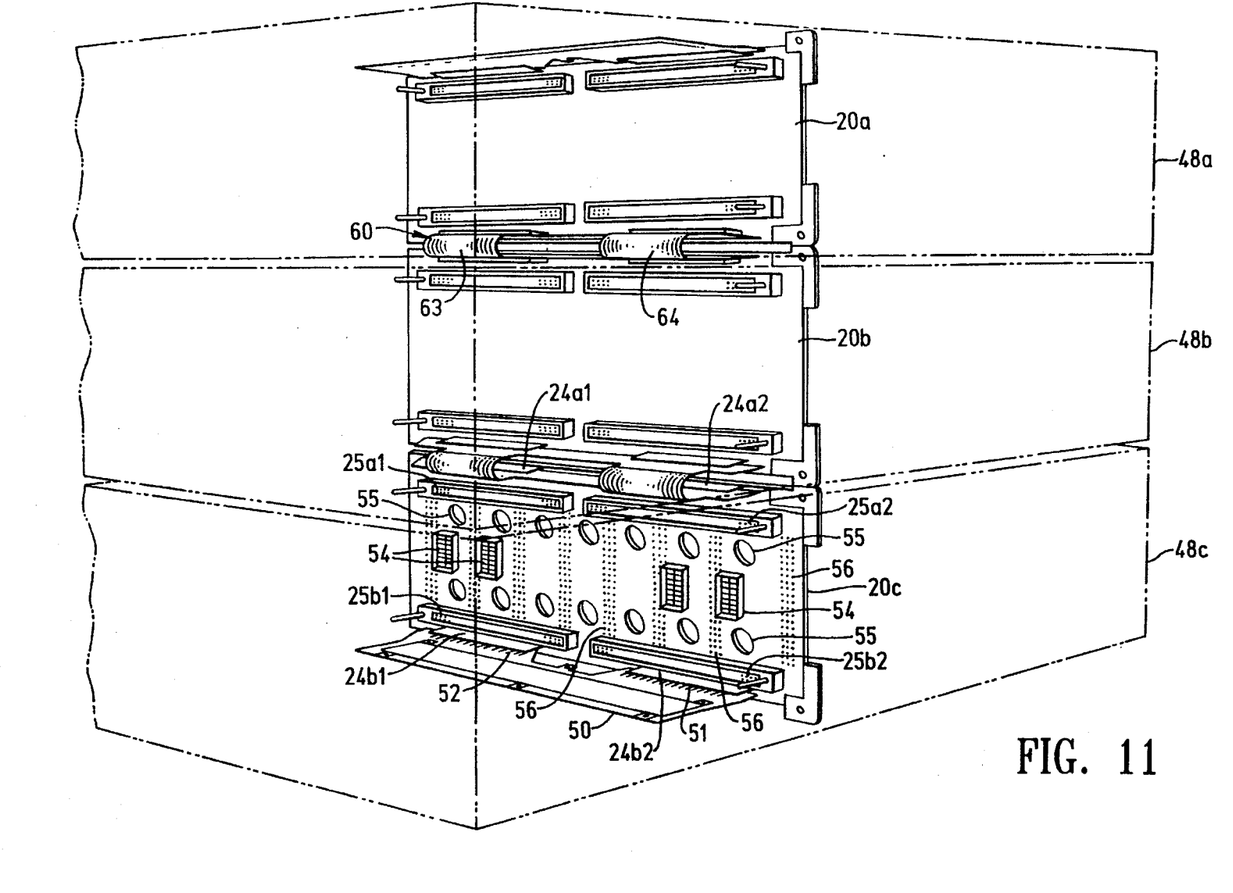
FIG. 11 is a schematic perspective view illustrating a preferred embodiment of the invention.

FIG. 11 shows a preferred embodiment of the module substrate 20. In this figure, three module substrates 20a–20c are illustrated as each being located within a separate enclosure 48a–48c respectively, shown in broken line form. Since the module substrates 20 are identical in construction, only the lowermost module 20c is illustrated in detail. Each interconnect connector 24a, 24b, comprises a pair of connector segments 24a1, 24a2, 24b1, 24b2 secured to the obverse surface of the substrate 20. Each connector segment has a plurality of spaced pairs of conductive female contactor pads, and the spacing and dimensions are such as to be complementary with corresponding male connectors in the removable personality cards.

Figure 15:
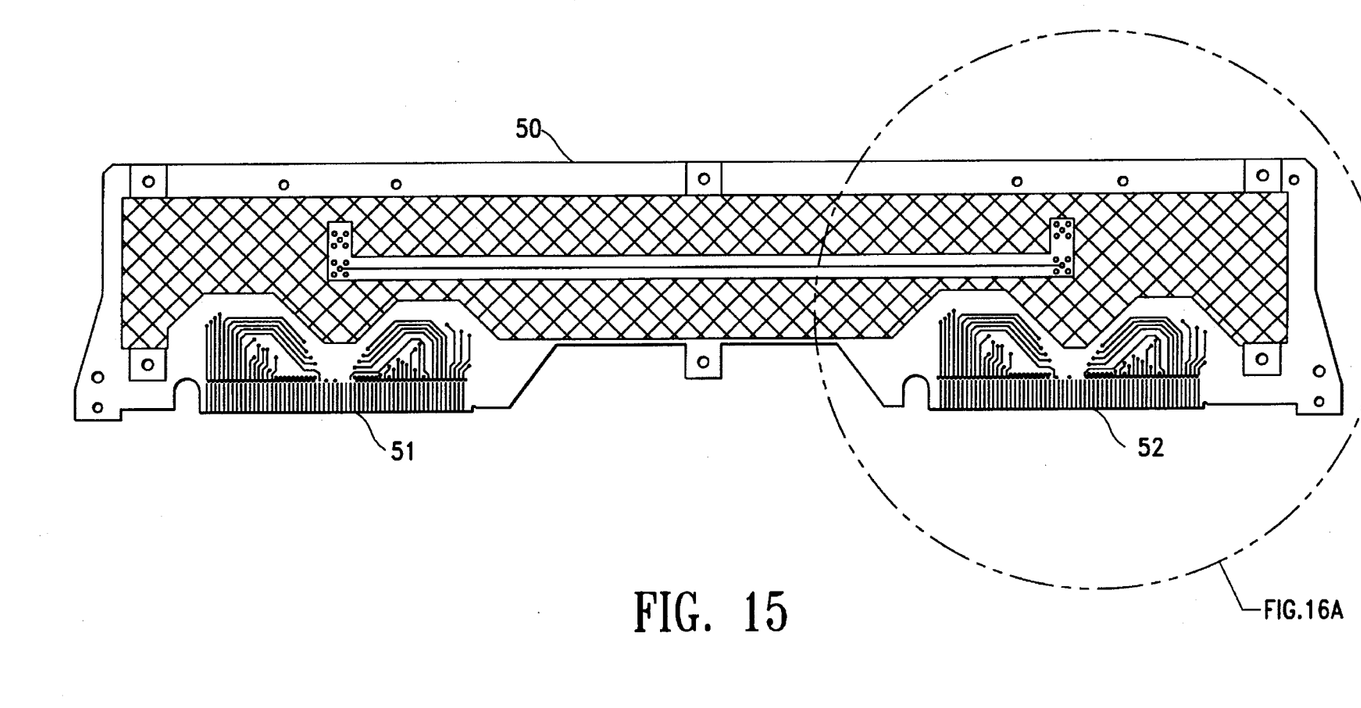
FIG. 15 is a plan view of one surface of a jumper-type bus path defining card connector.
Figure 16A:
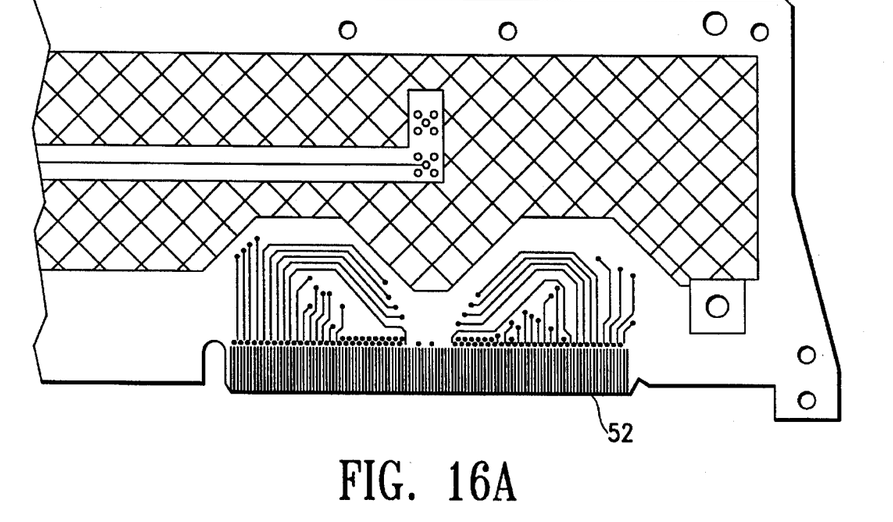
FIGS. 16A, 16B are enlarged detailed views of the obverse and reverse sides of the card connector of FIG. 15.
Figure 16B:
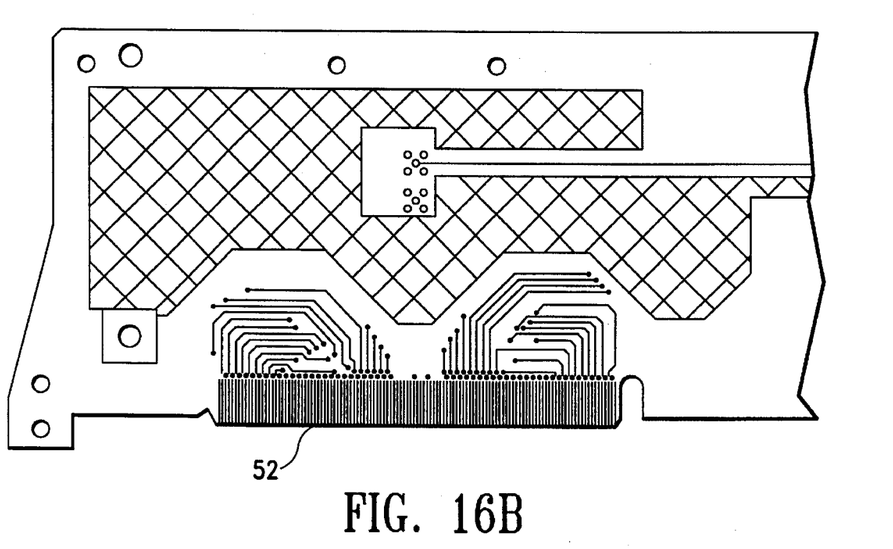

FIG. 11 shows a personality card 50 installed in lower segments 24b1, 24b2. Card 50, which is shown in greater detail in FIGS. 15, 16A and 16B, has a flanking pair of extending connector terminal portions 51, 52 each of which mates with the corresponding segment 24b1, 24b2. As best seen in FIGS. 15, 16A and 16B, card 50, which is a J-type (jumper) card, has a plurality of electrically conductive paths formed on each surface of the card with through holes for enabling electrical interconnection between the various conductors.

Positioned inboard of the connector segments 24a1, 24a2, 24b1 and 24b2 are the initiator connectors 25a and 25b. Like the interconnect connectors 24a, 24b, the initiator connectors each comprise two individual segments 25a1, 25a2; 25b1, 25b2. Each segment preferably comprises an AMP 1-533254-0 9323 type multiple pin connector available from AMP Corporation. Positioned in the row located centrally of substrate 20 are four power connector sockets 54, which are 14 pin socket connectors. A plurality of ventilation apertures 55 promotes air circulation within the associated enclosure 48. It should be noted that the target connectors 26a–26h are located on the reverse side of the substrate 20 at hidden locations corresponding to the columns of the individual pin connectors designated with reference numeral 56. There are eight such target connectors in all.

Figure 12:
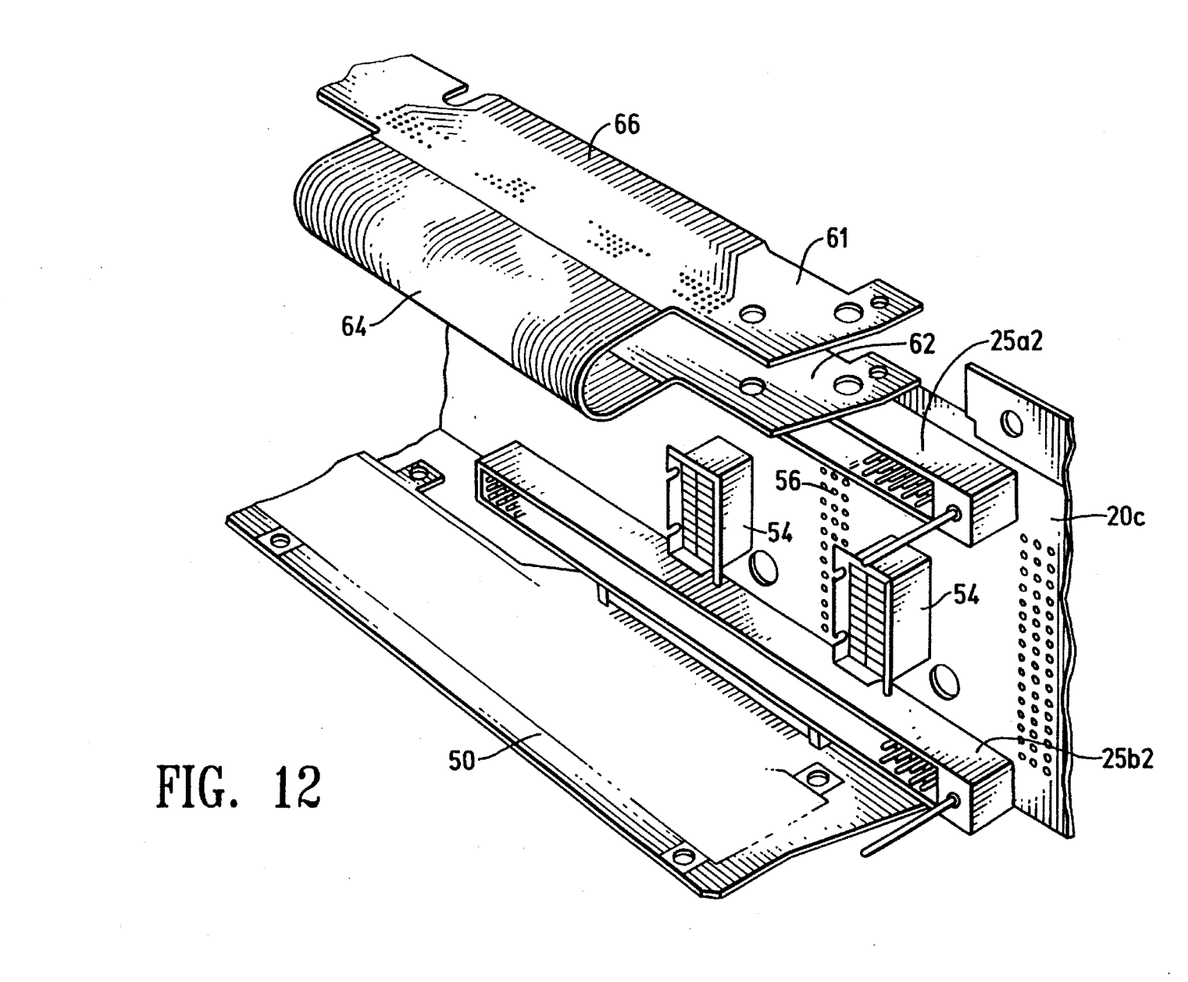
FIG. 12 is an enlarged perspective partial view illustrating portions of the FIG. 11 embodiment.
Figure 13:
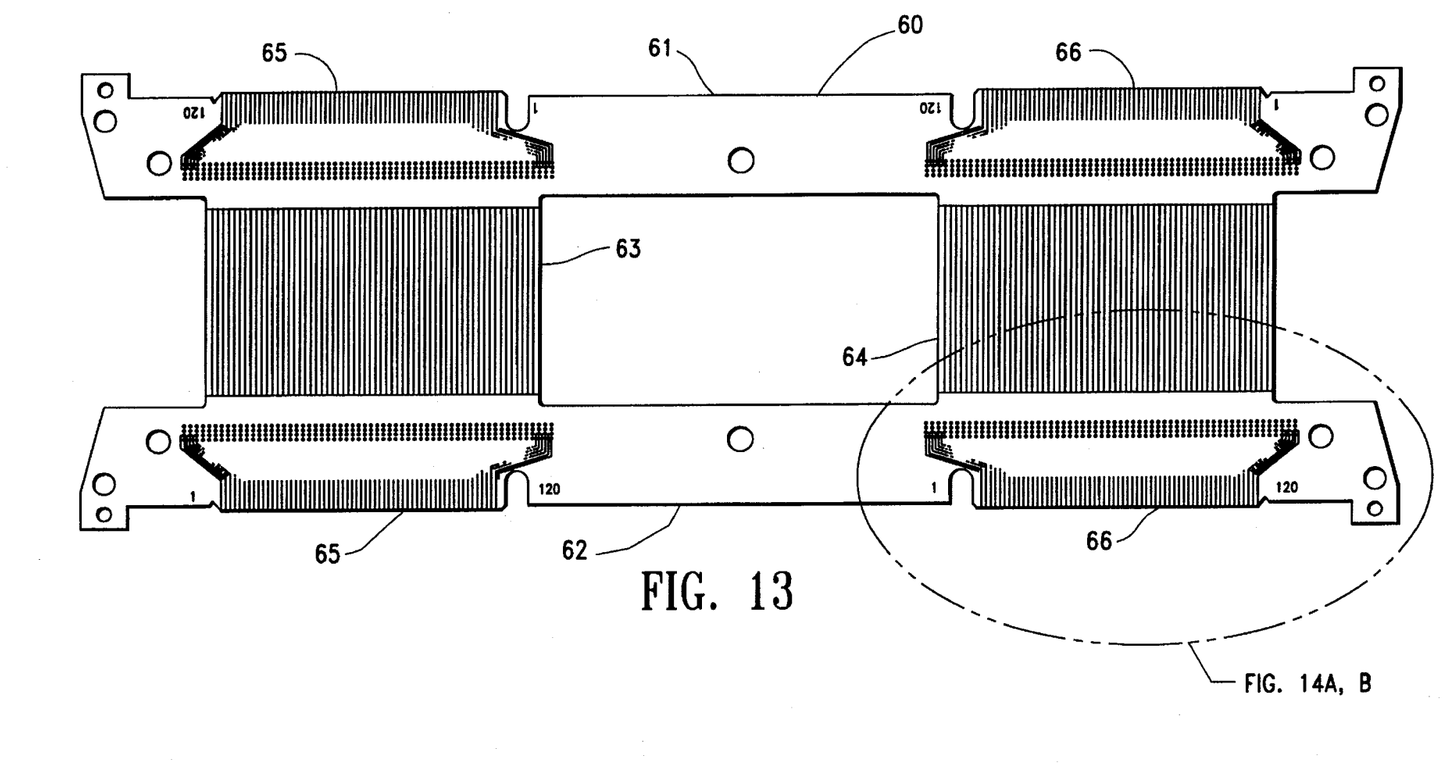
FIG. 13 is a plan view of one surface of a flexible coupler.
Figure 14A:
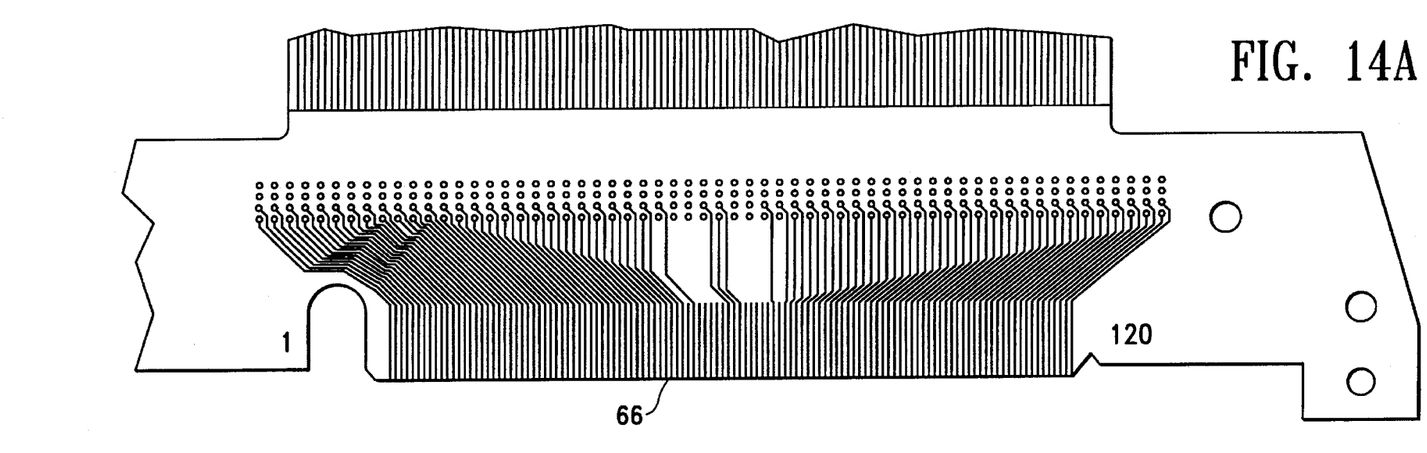
FIGS. 14A and 14B are enlarged views of the obverse and reverse side of portions of the connector pads of the coupler of FIG. 13 designated 14A, B.
Figure 14B:
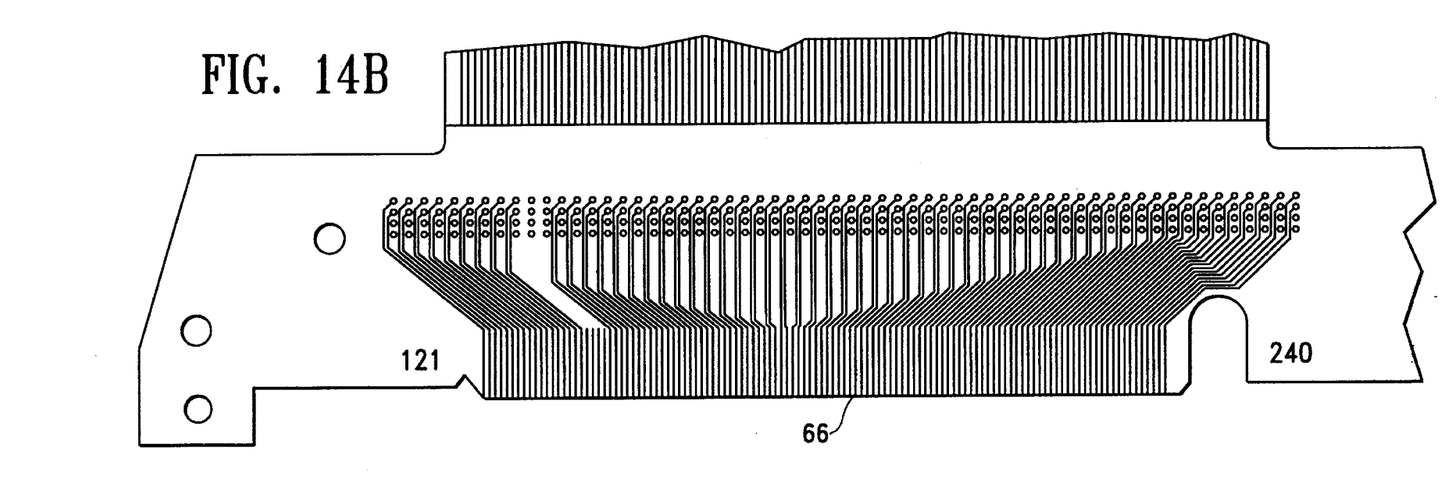

Illustrated in FIGS. 11 and 12 is the interconnect card generally designated with reference numeral 60 and shown in the folded state. As seen in these figures, card 60 comprises a pair of substantially rigid support members 61, 62 mechanically connected together by means of a pair of flexible plastic web portions 63, 64. As best seen in FIGS. 13, 14A and 14B, each support member 61, 62 is provided with a pair of male connector sections 65, 66 on which conductive pads are located which mate with the corresponding conductors in the interconnect connector segments of adjoining module substrates 20b, 20c. The conductive terminals in sections 65, 66 are electrically connected to electrical conductors embedded in the flexible web portions 64. Thus, the flexible web portions 64 not only provide mechanical connection between support members 61, 62 but also provide the electrically conductive paths required to interconnect the bus segments of adjoining substrates 20.

As will now be apparent, the invention affords a highly flexible bus routing capability which provides superior host connectivity in both single and multiple host environments. In addition, systems incorporating the invention are relatively simple and easy to install and maintain, and use a minimum of actual cabling (web portions 63, 64), with correspondingly improved reliability. In addition, the modularity of the design, when coupled with the flexible use of various personality cards, permits a wide variety of physical bus implementations requiring only the proper selection and installation of personality cards. Further, since the bus conductor individual lines can be precisely laid out on the substrate 20, the linear path length of each bus conductor can be reliably predicted so that bus path lengths can be accurately determined and compared to the bus standards. This is particularly useful when expanding an originally configured system to incorporate additional modules, or when reconfiguring an originally configured system to change the bus routing.

While the above provides a full and complete disclosure of the preferred embodiment of the invention, various modifications, alternate constructions and equivalents will occur to those skilled in the art. For example, while the preferred embodiment has been described with reference to a SCSI bus with eight bus segments per substrate, other types of bus standards may be employed and different numbers of bus segment groups can be implemented, as desired. Therefore, the above description and illustrations should not be construed as limiting the scope of the invention which is defined by the appended claims.

What is claimed is:

1. A bus routing apparatus for enabling selective interconnection of active computing devices, said apparatus comprising:

a substrate having a pair of connector portions at respective edges of the substrate, each connector portion having a plurality of connector pads;

a plurality of multiple conductor bus path groups carried by said substrate and coupled between said connector pads of said connector portions;

a plurality of multiple terminal device connectors carried by said substrate and electrically coupled to selected ones of said bus path groups;

at least one multiple conductor flexible cable card connector having end connectors removably attachable to said connector portions of said substrate for enabling electrical coupling of said bus path groups to associated computing devices; and at least one bus path defining card connector removably attachable to said connector portions of said substrate, said card connector including a plurality of electrically conductive paths capable of selectively intercoupling the bus path groups carried by said substrate.

2. The apparatus of claim 1 wherein said pair of connector portions is part of a plurality of pairs of connector portions, the connector portions of each pair being located adjacent a different edge portion of said substrate.

3. The apparatus of claim 2 wherein said card connector is configured to be removably attached to two of said connector portions located adjacent the same edge portion.

4. The apparatus of claim 1 wherein the individual connectors of said bus path groups are electrically coupled to individual ones of said connector pads.

5. The apparatus of claim 1 wherein said device connectors are arranged in first and second groups, a first type of device connector in said first group and a second type of device connector in said second group.

6. The apparatus of claim 5 wherein said first group of said device connectors is located on an obverse surface of said substrate, and wherein said second group of said device connectors is located on a reverse surface of said substrate.

7. The apparatus of claim 1 wherein said flexible cable is substantially flat.

8. The apparatus of claim 1 wherein said electrically conductive paths of said bus path defining card connector are arranged in a plurality of card path groups, each associated to a different one of said bus path groups.

9. The apparatus of claim 8 wherein each of said card path groups is configured as a bus terminator.

10. The apparatus of claim 8 wherein each of said card path groups is configured as a J-type bus routing connection.

11. The apparatus of claim 8 wherein said card path groups are configured as an A-type bus routing connection.

12. The apparatus of claim 8 wherein said card path groups are configured as an E-type bus routing connection.

13. The invention of claim 8 wherein said card path groups are configured as an S-type bus routing connection.

14. The invention of claim 8 wherein said card path groups are configured as an I-type bus routing connector.

15. A modular bus routing system for enabling reconfigurable interconnection of active electrical devices in a bus oriented computer system, said modular bus routing system comprising:

a plurality of substrate members each having a pair of connector portions at respective edges of ones of the substrate plurality substrate members, each connector portion having a plurality of connector pads, a plurality of multiple conductor bus path groups carried by said substrate and coupled between said connector pads of said connector portions, and a plurality of multiple terminal device connectors carried by said substrate and electrically coupled to selected ones of said bus path groups;

a plurality of multiple conductor flexible cables card connectors each having a pair of end connectors removably attached to connector portions of selected different ones of said plurality of substrate members; and at least one bus path defining card connector removably attached to a connector portion of one of said plurality of substrates for selectively intercoupling the bus path groups carried by said substrates.

16. The invention of claim 15 wherein at least some of said plurality of substrates each has a plurality of pairs of connector portions, including the pair of connector portions, the Connector portions of each pair being located adjacent a different edge portion of said substrate.

17. The invention of claim 15 wherein said electrically conductive paths of said at least one bus path defining card connector are arranged in a plurality of card path groups each associated to a different one of said bus path groups carried by said substrates.

18. The invention of claim 17 wherein each of said card path groups is configured as a bus terminator.

19. The invention of claim 17 wherein each of said card path groups is configured as a J-type bus routing connection.

20. The invention of claim 17 wherein said card path groups are configured as an A-type bus routing connection.

21. The invention of claim 17 wherein said card path groups are configured as an E-type bus routing connection.

22. The invention of claim 17 wherein said card path groups are configured as an S-type bus routing connection.

23. The invention of claim 17 wherein said card path groups are configured as an I-type bus routing connection.

24. A bus routing apparatus for enabling selective interconnection of active computing devices, said apparatus comprising:

a substrate having a pair of connector portions each, connector portion having a plurality of connector pads;

a plurality of multiple conductor bus path groups carried by said substrate and coupled between said connector pads of said connector portions;

a plurality of multiple terminal device connectors carried by said substrate and electrically coupled to selected ones of said bus path groups; and two bus path defining card connectors removably attachable to respective ones of said connector portions of said substrate, at least one of said card connectors including a plurality of electrically conductive paths for selectively intercoupling at least two of the bus path groups carried by said substrate.

25. A bus routing apparatus for enabling selective interconnection of active computing devices, said apparatus comprising:

a substrate having a pair of connector portions, each having a plurality of connector pads;

a plurality of multiple conductor bus path groups carried by said substrate and coupled between said connector pads of said connector portions;

a plurality of multiple terminal device connectors carried by said substrate and electrically coupled to selected ones of said bus path groups;

a bus path defining card connector, removably attachable to said connector portions of said substrate, said card connector including a plurality of electrically conductive paths for intercoupling at least two of the bus path groups carried by said substrate; and a second card connector, removably attachable to said connector portions of said substrate.

26. The bus routing apparatus of claim 25, wherein the second card connector is a second bus path defining card connector, removably attachable to said connector portions of said substrate, said card connector including a plurality of electrically conductive paths for intercoupling at least two of the bus path groups carried by said substrate.

27. The bus routing apparatus of claim 25, wherein the second card connector is a multiple conductor flexible cable card connector having end connectors removably attachable to said connector portions of said substrate for enabling electrical coupling of said bus path groups to associated computing devices.

28. A bus routing apparatus for enabling selective interconnection of active computing devices, said apparatus comprising:

a substrate having a pair of connector portions, each having a plurality of connector pads;

a plurality of multiple conductor bus path groups carried by said substrate and coupled between said connector pads of said connector portions;

a plurality of multiple terminal device connectors carried by said substrate and electrically coupled to selected ones of said bus path groups;

at least one multiple conductor flexible cable card connector having end connectors removably attachable to said connector portions of said substrate for enabling electrical coupling of said bus path groups to associated computing devices; and at least one bus path defining card connector removably attachable to said connector portions of said substrate, said card connector including a plurality of electrically conductive paths for intercoupling at least two of the bus path groups carried by said substrate.

* * * * *